United States Patent
Murcin

(10) Patent No.: US 10,610,790 B1
(45) Date of Patent: Apr. 7, 2020

(54) DATA ANALYTICS FOR DAILY FANTASY SPORTS GAMES

(71) Applicant: David C. Murcin, Los Angeles, CA (US)

(72) Inventor: David C. Murcin, Los Angeles, CA (US)

(*) Notice: Subject to any disclaimer, the term of this patent is extended or adjusted under 35 U.S.C. 154(b) by 584 days.

(21) Appl. No.: 15/179,845

(22) Filed: Jun. 10, 2016

(51) Int. Cl.
  *A63F 13/65* (2014.01)
  *A63F 13/828* (2014.01)
  *A63F 13/35* (2014.01)

(52) U.S. Cl.
  CPC ............ *A63F 13/828* (2014.09); *A63F 13/35* (2014.09); *A63F 13/65* (2014.09)

(58) Field of Classification Search
  None
  See application file for complete search history.

(56) References Cited

U.S. PATENT DOCUMENTS

| | | | | |
|---|---|---|---|---|
| 8,447,420 B2* | 5/2013 | Bloodworth | ............ | A63F 9/24 463/43 |
| 9,767,350 B2* | 9/2017 | Rodriguez | ............ | G06F 16/335 |
| 2006/0183548 A1* | 8/2006 | Morris | ............ | G07F 17/32 463/42 |
| 2008/0076497 A1* | 3/2008 | Kiskis | ............ | G07F 17/32 463/9 |
| 2008/0281444 A1* | 11/2008 | Krieger | ............ | A63F 13/12 700/91 |
| 2013/0045806 A1* | 2/2013 | Bloodworth | ............ | A63F 9/24 463/43 |
| 2014/0045595 A1* | 2/2014 | Baschnagel, III | ...... | A63F 13/10 463/40 |
| 2014/0302914 A1* | 10/2014 | Weinstein | ............ | A63F 13/828 463/25 |
| 2015/0131845 A1* | 5/2015 | Forouhar | ........... | G06K 9/00724 382/100 |
| 2016/0263483 A1* | 9/2016 | Le | ......... | A63F 13/828 |

* cited by examiner

*Primary Examiner* — Sunit Pandya
(74) *Attorney, Agent, or Firm* — Hugh P. Gortler

(57) ABSTRACT

A method of performing data analytics for daily fantasy sports games comprises collecting sets of predictions from a multitude of online players prior to the start of a game period. Each set includes numerical predictions of performances of different athletes at different positions in different performance categories in at least one sporting event. The predictions are locked at a predetermined time prior to the start of the game period. The method further comprises visually displaying statistics of the predictions to all of the online players after the predictions have been locked, but prior to the start of the game period.

13 Claims, 2 Drawing Sheets

DATA ANALYTICS FOR DAILY FANTASY SPORTS GAMES

BACKGROUND

In traditional fantasy sports games, players compete against others by building a team of professional athletes from a particular league or competition while remaining under a salary cap, and earn points based on the actual statistical performance of the players in real-world competitions. In daily fantasy sports games, players compete over short-term periods, such as a week or single day of competition, as opposed to those that are played across an entire season. Daily fantasy sports games are typically structured in the form of paid competitions typically referred to as a "contest." Winners receive a share of a predetermined pot funded by their entry fees.

DETAILED DESCRIPTION

Figure 1:
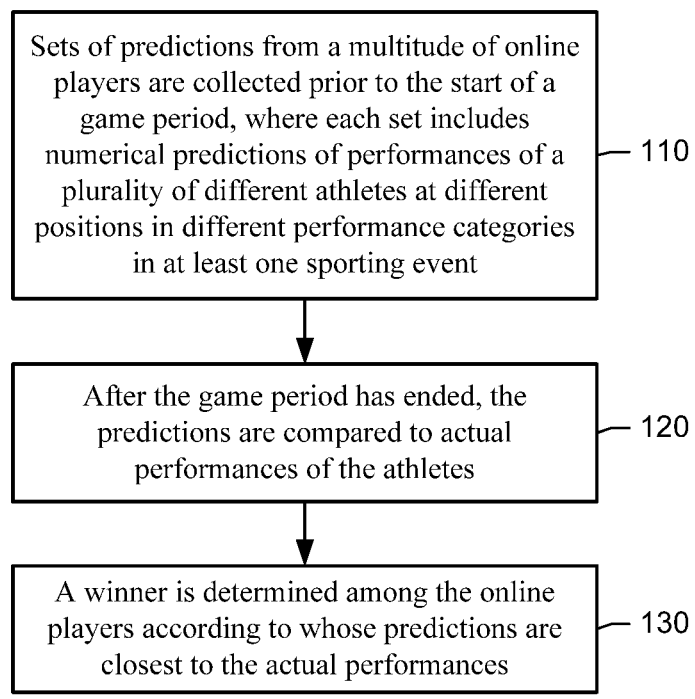
FIG. 1 is an illustration of an online game of skill.

Reference is made to FIG. 1, which illustrates an online game of skill. The game is one of skill because the outcome is determined mainly by mental skill of online players, rather than by chance.

At block 110, sets of predictions from a multitude of online players are collected prior to the start of a game period. Each set includes numerical predictions of performances of a plurality of different athletes at different positions in different performance categories in at least one sporting event.

Examples of sporting events include, without limitation, team sports such as football, baseball, basketball, soccer, and hockey. Further examples of sporting events include, without limitation, individual sporting events such as boxing, mixed martial arts (MMA), and horse racing. Sporting events may be professional and/or collegiate. Sporting events may be real events and/or eSports. eSports as used herein refer to video games such as League of Legends and Counter-Strike.

Those people participating in real sporting events are referred to as athletes. For instance, Tom Brady, quarterback of the New England Patriots, is an athlete. Those people playing and competing in eSports (as themselves or as game characters) are also referred to as athletes. Thus, an athlete as used herein may be real or virtual.

As used herein, the term "multitude of players" means at least on the order of thousands of players. The multitude of players could be thousands of players, tens of thousands of players, hundreds of thousands of players, or more.

As used herein, a "game period" refers to a period of time during which a roster of athletes performs only once. Each of the at least one sporting events occurs only once during the game period. Consequently, an athlete will perform only once during the game period. In baseball, the performance may be daily. In football, the performance may be weekly.

As used herein, a performance category refers to the acts being predicted. For example, if a selected athlete is a quarterback, performance categories may include passes attempted, passes completed, passing yards, and passing touchdowns. An online player predicts a number for each of these categories. If a selected athlete is a basketball player, performance categories may include number of points scored, number of assists, number of rebounds, and number of steals.

The online players may select rosters of athletes at different positions, where each position has its own performance categories. Each sport may have tens or hundreds of possible performance categories. The following tables provide examples of rosters and performance categories for different sporting events. The numbers in parentheses represent the number of athletes selected.

TABLE 1

NFL Football

| | |
|---|---|
| Quarterback (1) | Pass Attempts |
| | Pass Completions |
| | Passing Yards (Total) |
| | Passing Touchdowns |
| Running Backs (2) | Rushing Attempts |
| | Rushing Yards |
| | Rushing Touchdowns |
| Wide Receiver (1) | Receptions |
| | Receiving Yards |
| | Touchdown Receptions |
| Tight End (1) | Receptions |
| | Receiving Yards |
| | Touchdown Receptions |
| Flex Position (1): RB or WR or TE | Receptions |
| | Rushing Yards |
| | Receiving Yards |
| | Touchdowns |
| Defensive Unit (1) | Sacks |
| | Interceptions |
| Kicker (1) | Field Goal Yardage |
| | Points After Touchdown |

TABLE 2

Major League Baseball

| | | |
|---|---|---|
| Pitcher (1) | | Number of Innings Pitched |
| | | Number of Strikeouts |
| Batters (8): | Catcher; 1st Base; 2nd Base; | Numbe of Hits |
| | 3rd Base; Left Field; | Number of Runs Scored |
| | Center Field; Right Field | Number of RBIs |

TABLE 3

NBA Basketball

| | |
|---|---|
| Point Guard (1) | Number of Points Scored |
| Shooting Guards (2) | Number of Assists |
| Small Forwards (2) | Number of Rebounds |
| Power Forwards (2) | Number of Steals |
| Center (1) | |

TABLE 4

Soccer

| | |
|---|---|
| Goalkeeper (1) | Number of Shots on Goal Against |
| | Number of Goals Against |
| | Number of Penalty Kick Saves |
| Forwards (2) | Number of Shots |
| Midfielders (2) | Number of Shots on Goal |
| Defenders (2) | Number of Goals |
| Flex Player (1): Forward, Midfielder or Defender | Number of Assists |

TABLE 5

NHL Hockey

| | |
|---|---|
| Goalies (2) | Number of Shots on Goal Against |
| | Number of Goals Against |
| Centers (2) | Number of Shots on Goal |
| Left/Right Wingers (3) | Number of Goals |
| Defensemen (2) | Number of Assists |

TABLE 6 eSports

| | |
|---|---|
| Players (5): Top; Jungle; Mid; ADC; Support | Kills |
| | Assists |
| Flex player (1) | Kills |
| | Assists |
| Team Slot (1) | Turrets |
| | Dragons |
| | Barons |

A set of predictions is not limited to athletes from the same team in the same sporting event. Each online player is free to select athletes from across different teams, as long as the athletes perform during the same game period. A player may select an athlete once per game period.

At block 120, after the game period has ended, the predictions are compared to actual performances of the athletes. At block 130, a winner is determined among the players according to whose predictions are closest to the actual performances. For instance, the online player whose aggregate predictions come closest to the aggregate actual performances is declared the winner. Consider the following simple example involving two players: A first player selects a quarterback and predicts that the quarterback will complete 8 of 12 passes for 150 yards and 1 touchdown. A second player selects the same quarterback, and makes a prediction of 7/12 for 120 yards and 0 touchdowns. During the game period, the quarterback actually completes 6 of 12 passes for 150 yards and 3 touchdowns. The first player's aggregate predictions come closest to the aggregate actual performances. Therefore, the first player wins.

In real situations, there will be multitudes of players, each submitting numerical predictions for different athletes playing different positions. The examples in the tables above are more representative of the predictions by each of the multitude of players.

The game of FIG. 1 may be used to perform data analytics for a daily fantasy sports game.

Figure 2:
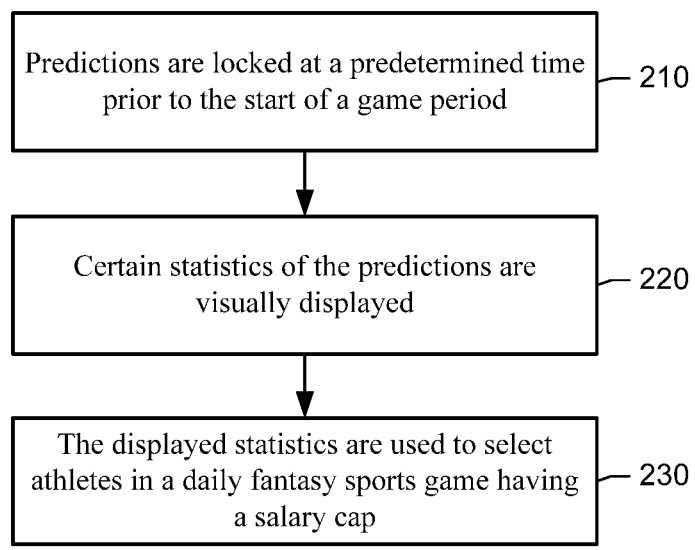
FIG. 2 is an illustration of a method of performing data analytics for a daily fantasy sports game.

Reference is now made to FIG. 2, which illustrates a method of using the game of FIG. 1 to perform data analytics for daily fantasy sports games. At block 210, the predictions are locked at a predetermined time prior to the start of the game period. This means that online players are locked out from submitting and/or changing their predictions.

At block 220, certain statistics of the predictions are visually displayed to all of the players after the predictions have been locked, but prior to the start of the game period. For example, the statistics may include a statistical mode, which represents the numerical prediction that is most commonly submitted by players for each performance category, for each athlete, in each sport, each game period. These analytics can offer visibility into which active athletes are trending that day. They can provide insight as to who other people deem the most desirable athletes to draft.

Displayed statistics such as modes may be used as trending data to aid in salary cap valuations. The modes indicate how other online players will value an athlete versus that athlete's salary cap figure.

At block 230, the online players may use the displayed statistics to select athletes in a daily fantasy sports game having a salary cap. For instance, the online players may use the analytics to decide on how much salary cap money to spend on particular athletes on all other fantasy sites that impose a salary cap.

For rookie contestants and novices, the displayed statistics may serve as a simple, instructive guide for learning why a majority of other online players make particular predictions. This guide may give online players who are rookie contestants and novices the confidence to enter into daily fantasy sports games.

The time at which the predictions are locked and the statistics are displayed should be sufficient to allow the online players to use the statistics to play one or more daily fantasy sports games that impose a salary cap. For instance, this might be fifteen minutes to an hour before the start of a game period.

Figure 3:
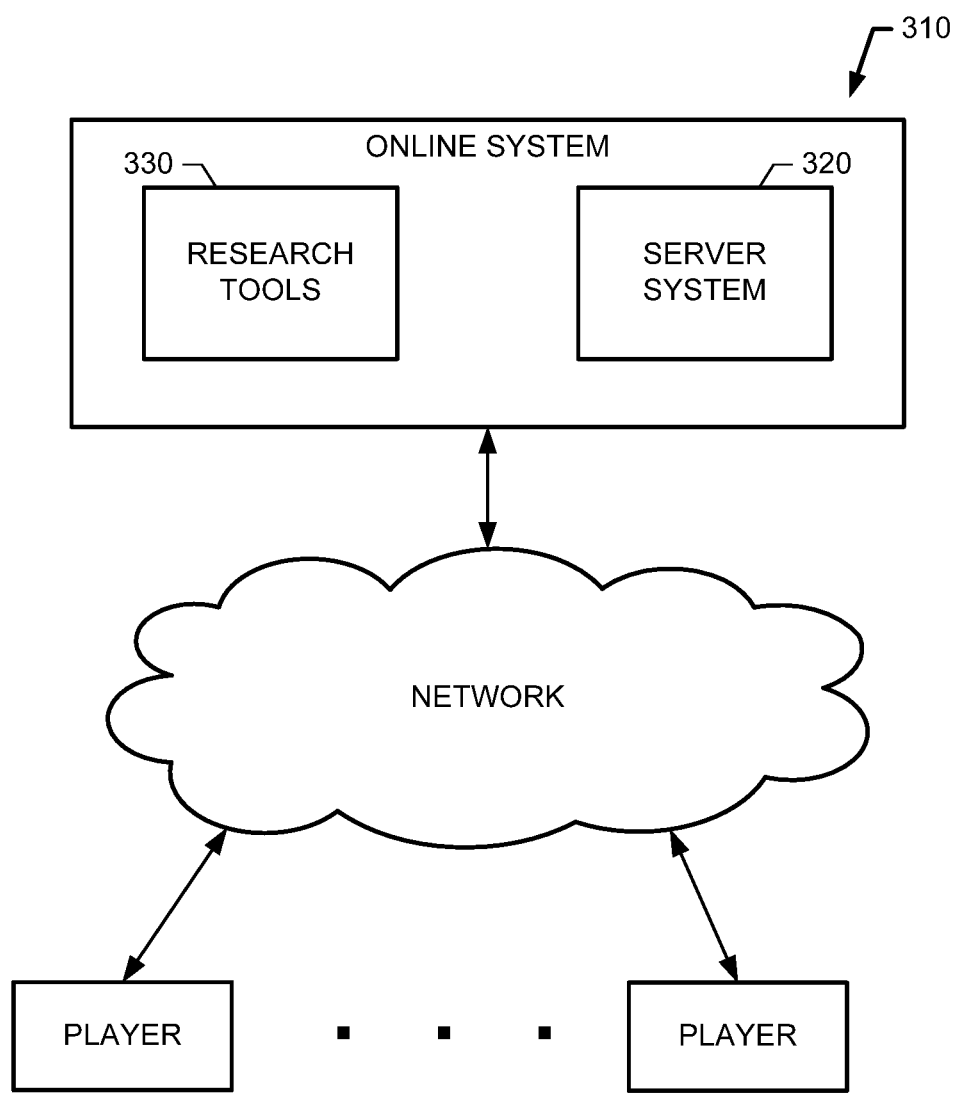
FIG. 3 is an illustration of a system for performing the data analytics.

Reference is now made to FIG. 3, which illustrates an online system 310 for performing the data analytics for daily fantasy sports games. The online system 310 includes a server system 320 programmed to perform the methods of FIGS. 1 and 2. Thus, the server system 320 enables a multitude of players to log in via a network, choose at least one sport in which to compete, draft a roster of athletes, and submit numerical predictions for each performance category.

The server system 320 then collects sets of predictions from the multitude of online players prior to the start of game time; locks the predictions at a predetermined time prior to the start of the game period; visually displays statistics of the predictions to all of the players after the predictions have been locked, but prior to the start of the game period; compares the predictions to actual performances of the athletes after the game period has ended; and determines a winner among the players according to whose predictions are closest to the actual performances. The server system 320 may also determine one or more runner ups. The server system 320 or another system may make a payout to each winning player and runner up.

The online system 310 may include traditional research tools 330. The traditional research tools 330 may provide information for formulating the predictions. This information may include, without limitation, historical performance of athletes, information about home field advantage, strengths/weaknesses of opponents, game plans, injury reports, weather, etc. The traditional research tools 330 may also be provided by third party vendors.

The invention claimed is:

1. A method for a prediction-based game, the method comprising: collecting sets of predictions from a multitude of online players prior to start of a daily fantasy sports game having a salary cap, each of the sets including numerical predictions of performances of a plurality of different athletes at different positions in different performance categories in at least one sporting event; locking the predictions at a predetermined time prior to the start of the fantasy sports game; visually displaying statistics of the predictions that have been collected from the online players, the statistics being visually displayed to all of the online players after the locking but before the start of the fantasy sports game, the visually displayed statistics including trending data to aid in salary cap valuations; and determining a winner among the online players according to whose predictions are closest to the actual performances.

2. The method of claim 1, further comprising using the displayed statistics to select athletes in the daily fantasy game with respect to the salary cap.

3. The method of claim 2, wherein the displayed statistics includes modes.

4. The method of claim 2, wherein the displayed statistics are used as trending data to aid in salary cap valuations.

5. The method of claim 1, further comprising providing research tools to the online players to assist with the predictions.

6. The method of claim 1, wherein the predictions are collected during a game period corresponding to the prediction-based game, wherein each of the at least one sporting events occurs only once during the game period, and wherein the predictions are compared to the actual performances after the game period has ended.

7. The method of claim 1, wherein the statistics are visually displayed at a time that allows the online players to draft athletes for the daily fantasy sports game.

8. A method of performing and using data analytics for a daily fantasy sports game, the method comprising: running a prediction-based game, including collecting sets of predictions from a multitude of online players prior to start of the daily fantasy sports game, each set including numerical predictions of performances of different athletes at different positions in different performance categories in at least one sporting event, the predictions locked at a predetermined time prior to the start of the daily fantasy sports game; visually displaying statistics of the predictions that have been collected from the online players, the statistics being visually displayed to all of the online players after the predictions have been locked, but prior to the start of the daily fantasy sports game; and using the displayed statistics to select players in the daily fantasy sports game under constraints of a salary cap.

9. The method of claim 8, wherein the displayed statistics includes modes.

10. The method of claim 8, wherein the displayed statistics are used as trending data to aid in salary cap valuations.

11. A data analytics system for daily fantasy sports games comprising a server system programmed to: run a prediction-based game, including collecting sets of predictions from a multitude of online players prior to start of a daily fantasy sports game, each set including predictions of performances of different athletes at different positions in different performance categories in at least one sporting event, the predictions locked at a predetermined time prior to the start of the daily fantasy sports game; and visually display statistics of the predictions that have been collected from the online players, the statistics being visually displayed to all of the online players after the predictions have been locked, but prior to the start of the daily fantasy sports game, the displayed statistics including modes.

12. The system of claim 11, wherein the server system is further programmed to compare the predictions to actual performances of the athletes; and determine a winner among the online players according to whose predictions are closest to the actual performances.

13. The system of claim 11, further comprising research tools; wherein the server system is programmed to make the research tools accessible to the online players to assist with the predictions.

* * * * *